Feb. 20, 1968        S. C. GRASKO ET AL        3,370,024
MULTICOLOR COATING COMPOSITION AND METHOD
OF MAKING AND PACKAGING SAME
Original Filed Aug. 28, 1959
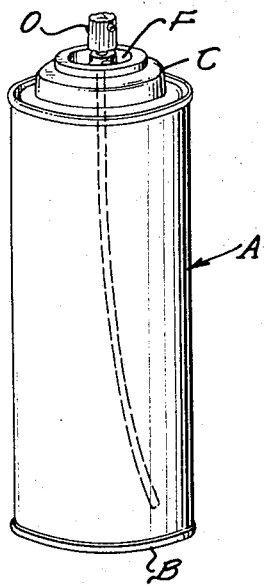
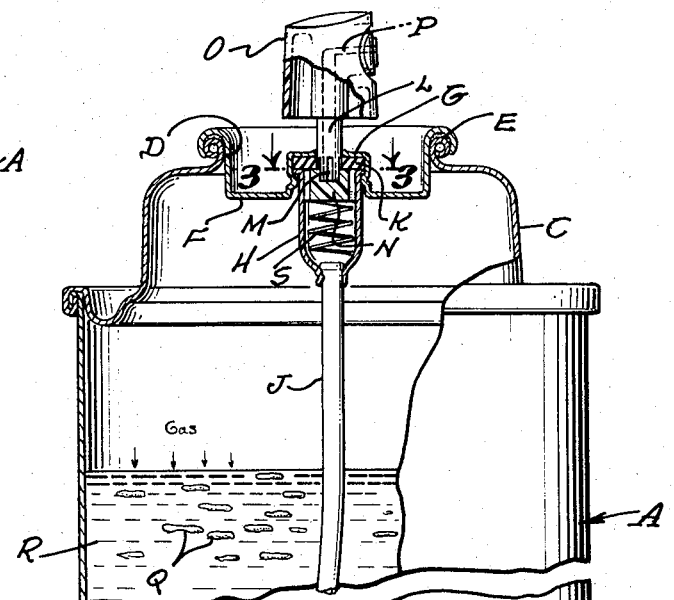
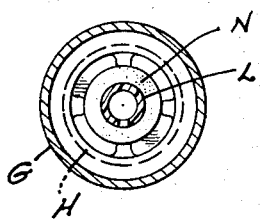
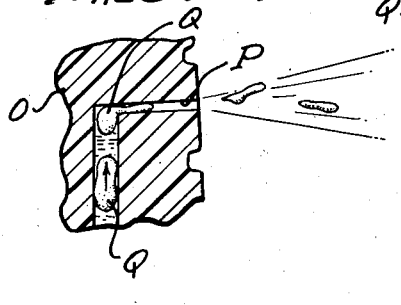
STEPHEN C. GRASKO,
STEPHEN S. KANE,
INVENTORS.
BY
William C. Babcock
ATTORNEY.

United States Patent Office 3,370,024
Patented Feb. 20, 1968

3,370,024
MULTICOLOR COATING COMPOSITION AND METHOD OF MAKING AND PACKAGING SAME
Stephen C. Grasko, Los Angeles, and Stephen S. Kane, Burbank, Calif., assignors to Zolatone Process, Inc., Los Angeles, Calif., a corporation of California
Continuation of application Ser. No. 836,590, Aug. 28, 1959. This application Feb. 16, 1966, Ser. No. 540,112
8 Claims. (Cl. 260—3.5)

ABSTRACT OF THE DISCLOSURE

A multicolor coating composition in which a plurality of minute bodies of different colors defined by a first aqueous film-forming vehicle are suspended in a second non-aqueous colorless transparent film-forming vehicle prior to application on a desired surface to form a protective layer thereon, with said bodies after being applied to said surface being visible in their true colors through said second vehicle.

CROSS-REFERENCE TO RELATED APPLICATION

The present application is a continuation application of an application entitled Multicolor Coating Composition and Method of Making and Packaging Same filed in the Patent Office on Aug. 28, 1959, under Ser. No. 836,590.

BACKGROUND OF THE INVENTION

*Field of the invention*

A multicolor coating composition that can be applied as a protective film to a desired surface by a brush or in spray form, with the colors in said film when so applied being visible without distortion through a colorless transparent vehicle forming a part of said composition.

During the past few years the use of multicolor coating compositions for both decorative and protective purposes has increased steadily in popularity. Multicolor coating compositions available heretofore have been formed of either a lacquer, paint, enamel or oil, which is dispersed as finely divided particles or globules in an aqueous phase that contains a suspension stabilizer. The multicolor effect produced by previously available compositions was attained by dividing the lacquer, paint, enamel or oil used therein into two or more portions, pigmenting each of these portions with a different color, and then dispersing the two or more colored portions in the aqueous phase above mentioned.

Although literally any multicolor combination could be attained by the use of coating compositions heretofore available on the present-day market, these compositions had the inherent operational disadvantage that the applied coating was still only a lacquer, paint, enamel or oil, depending upon which of these vehicles comprised the particles or globules. Accordingly, the multicolor coating attained by the use of previously available compositions suffered from all the deficiencies common to the paint, lacquer, enamel or oil comprising the inner or dispersed phase, which could include poor adhesion, poor aging qualities, poor resistance to light, rapid temperature changes and weathering, as well as embrittlement leading to cracking, chipping and flaking from the surface on which it was applied. Furthermore, the previously available multicolor coating compositions were unduly bulky, for the film former was the inner phase of particled paint, lacquer, enamel or oil, with the outer phase merely serving as a medium to support the particles.

SUMMARY OF THE INVENTION

The primary purpose in devising the present invention is to provide a multicolor coating composition that is free from many of the operational disadvantages and deficiencies inherent in coating compositions of this type heretofore available, one having a greater covering ability per unit volume than previous compositions of this nature, and far greater versatility of use in that it can be applied to any desired surface from a self-pressurized combination container and applicator, conventional spray gun, or by dipping, brushing or the like.

Another object of the invention is to supply a novel multicolor coating composition that is not limited as to the use of a paint, lacquer, enamel or oil as the single film former therein, but instead employs two or more film formers, each of which is of a different chemical composition, but have the common physical characteristic of superior adhesion to wood, masonry, paper, fabrics and metals over that attainable by previously available coating compositions.

Yet another object of the invention is to furnish an improved multicolor coating composition in which the outer liquid phase thereof serves to not only support a large number of minute bodies or globules of a film former embodying the desired colors, but serves the additional function of a medium to carry another film former that is dissolved therein.

A still further object of the invention is to provide a multicolor coating composition that is ideally adapted for compact packaging in pressurized containers, requires a minimum of skill to apply in obtaining a desired decorative effect, and is particularly well suited for exploitation as a do-it-yourself item, particularly where small wall areas are to be decorated or protected such as in kitchens, bathrooms, and the like.

These and other objects and advantages of the present invention will become apparent from the following description of the composition thereof, the method of manufacturing and packaging same, the method of application thereof to a desired surface to completely coat same for both decorative and protective purposes, and a surface protected and decorated by a coating thereof.

BRIEF DESCRIPTION OF THE DRAWING

FIGURE 1 is a perspective view of a dispenser from which applicant's coating composition can be discharged under pressure as a spray to form a multicolored coating on a desired surface;

FIGURE 2 is a combined side elevational and vertical cross-sectional view of the device shown in FIGURE 1;

FIGURE 3 is a transverse cross-sectional view of the device taken on line 3—3 of FIGURE 2; and FIGURE 4 is a fragmentary enlarged cross-sectional view of the device showing the manner in which particles or bodies of the first phase (exaggerated as to size) discharge therefrom without being further sub-divided.

With further reference to the drawing, the dispensing device as shown in FIGURES 1 to 4 inclusive includes a cylindrical shell A, formed of a rigid sheet material capable of withstanding a substantial internal pressure. A bottom B is crimped or otherwise affixed to one end thereof.

DESCRIPTION OF THE PREFERRED EMBODIMENT

Also, a top C is affixed to the upper end of shell A, and is in fluid-tight contact therewith. An opening D is defined in top C that is surrounded by a lip E. A rigid dish-shaped member F is crimped to lip E, as best seen in FIGURE 2.

A tubular boss G projects upwardly from member F, and a tubular connector H depends from boss G. Connector H is in communication with a flexible tube J that projects downwardly inside shell A. The lower end of tube J is disposed adjacent bottom B.

A resilient washer K is positioned within boss G which slidably and sealingly engages a rigid tube L that has one or more slots M extending upwardly therein from the bottom of the tube. A resilient plug N is affixed to, and closes the lower end of tube L, but does not close the upper portions of the slot M.

A compressed helical spring S at all times tends to move the plug N upwardly, and maintain the upper surface thereof in pressure sealing contact with the lower surface of washer K.

Tube L has an actuating handle O mounted on the upper end portion thereof. A passage P extends through handle O and is in communication with the interior of tube L.

The present invention embodies two phases, a first aqueous phase that includes a pigment and an organic vehicle emulsion and a thickening agent. The first or inner phase is subdivided into a large number of small bodies or globules Q, the size of which is determined by the visual effect desired when the composition is applied to a surface to decorate or protect same. The second or outer phase R, which is substantially colorless, is primarily organic, and includes a volatile organic aromatic solvent in which a synthetic resin is dissolved, a water repellent thickening agent, and/or a suspension stabilizing agent to minimize coalescence of the small bodies or globules of the first phase that are suspended in the second phase.

The invention can include a third phase when the composition is to be applied as a spray from a self-pressurized container. The third phase may be either a gas under pressure or a volatile liquid having a relatively high vapor pressure at room temperature that serves to concurrently discharge both said first and second phases as a spray, when all three phases are confined in a closed container and a valve-controlled discharge passage in communication with the interior thereof is placed in the open position. It is immaterial as to whether or not the third phase dissolves in or is miscible with the second phase. When the valve-controlled discharge passage is placed in the open position the first and second phases are concurrently discharged from the container. The container has a conventional interiorly disposed tube that extends downwardly from the valve-controlled opening to a position adjacent the bottom thereof.

Following are examples of the present multicolor coating composition:

*Example No. 1*

First phase:                                          Parts by weight
(1) First portion—
    Titanium dioxide _____        4–15
    Polyvinyl acetate emulsion 51–53%
      solids _____       10–24
    Aqueous solution containing 2%
      methyl cellulose _____       86–61
(2) Second portion—
    Finely divided yellow chromate pigment _____        4–15
    Polyvinyl acetate emulsion 51–53%
      solids _____       10–24
    Aqueous solution containing 2%
      methyl cellulose _____       86–61

Total _____       100.00
(3) Third portion—
    Finely divided black iron oxide _____        4–15
    Polyvinyl acetate emulsion 51–53%
      solids _____       10–24
    Aqueous solution containing 2%
      methyl cellulose _____       86–61

Total _____       100.00

Second phase:
    Dimethyldioctadecyl ammonium bentonite _____        ½–3
    Calcium carbonate, finely particled _____        0–3
    Vinyl toluene-butadiene copolymer _____        3–10
    Xylene _____       96½–84

Total _____       100.00

The dimethyldioctadecyl ammonium bentonite and calcium carbonate are sufficiently finely divided as to not be visible to the naked eye when mixed with the xylene.

Sixty-five parts by weight of the above described first, second and third portions of the first phase and thirty-five parts by weight of the second phase are subjected to agitation by one or more rigid members rotating between 50 to 1000 revolutions per minute, depending on the size bodies or globules to which it is desired to subdivide the first phase. The resulting dispersion contains separate globules of the three colors; namely, white, black and yellow. The quantities of the first, second and third portions of the first phase agitated with the second phase will depend on the multicolor effect desired on the coated surface. For instance, if yellow is to be the predominant color, a greater quantity by weight of the second portion will be used than of the first and third portions.

When it is to be self-pressurized, the dispersion resulting from the agitation is placed in aerosol-type containers and dispensers, with a third phase being subsequently added to each of the containers. As previously mentioned, the third phase may be either a gas that is inert or indifferent to the materials comprising the first and second phases, or a liquid that tends to transform to the gaseous state to pressurize the interior of the container at normally encountered room temperatures. Examples of materials suitable for use as the third phase are butanes and butylenes, propane, propylene, dichlorodifluoro methane, monochloro tetrafluoroethane, dichloromonofluoro methane, trichloromonofluoromethane, and others. The third phase, should it be desired, may comprise a mixture of one or more of the above materials, or others that will provide a substantially constant pressure within the container during the time the multicolor coating composition is being discharged therefrom to obtain a spray of uniform density, with the pressure within the container preferably being maintained under fifty pounds to the square inch to permit the use of light-weight, inexpensive, disposable containers. From the previous description, the manner in which the pressurized multicolor coating composition is used will be apparent, and accordingly need not be repeated.

When the composition of the present invention is discharged as a spray from an aperture that is moved at a uniform rate and distance from the surface to be coated, which may be easily determined by but slight experimentation, will deposit as a continuous film thereon that strongly adheres to the surface and is sufficiently opaque that dissimilar materials on the surface are not visible through the applied coating. Of course, the same results are attainable if the coating composition is brushed onto the surface or the surface is dipped into composition. From experience, it has been found desirable that the material comprising the first phase have a viscosity which is substantially higher than that of the liquid forming the second phase.

The functions served by the components in the first and second phases of Example 1 are as follows, and are given in the order listed abvoe.

Titanium dioxide yellow chromate pigment and black iron oxide serve as pigments to obtain the desired multicolor effect.

The polyvinyl acetate copolymer emulsion is the first film former.

The methylcellulose solution serves as a thickening and emulsifying agent for the first phase to increase the viscosity thereof.

Dimethyldioctadecyl ammonium bentonite or similar alkyl ammonium bentonites swells when in an organic solvent, and in addition to increasing the viscosity of the second phase, imparts water repellent qualities to the multicolor coating composition and serves as a suspension stabilizer.

Calcium carbonate serves as an additional suspension stabilizer.

The vinyl toluene-butadiene copolymer is the second film former, and one that is particularly resistant to oxidation, abrasion and aging, as well as having excellent adhesion to wood, masonry, paper, fabrics and metals.

The xylene is the solvent for the second phase.

Constituents other than those listed above can be used in forming both the first and second phases of the present invention, as will be described in detail hereinafter. However, whether Example 1 above described is used in formulating the invention or one of the examples later to be described, both the first and second phases must have certain physical characteristics if the multicolor coating composition is to be successfully applied to a desired surface in spray form.

The first or inner phase must possess the following physical properties:
(a) High viscosity,
(b) Good adhesion to the surface to be coated,
(c) Dispersionable in the second or outer phase,
(d) Stability while in the dispersed state,
(e) High surface tension to remain in the same form as in the dispersion when discharged onto the surface as a part of the spray,
(f) High interface attraction to adjoining droplets of the second phase when discharged onto the surface to be coated, and
(g) Solidify after deposition on the surface to be coated at substantially the same rate as the second phase.

The second phase must possess the following physical properties:
(h) Subdividable into a large number of droplets when discharged as a spray onto the surface to be coated,
(i) Excellent adhesion to the surface to be coated,
(j) High interface attraction between droplets of second phase and globules of first phase when deposited on surface to be coated,
(k) Strong tendency for adjoining droplets of second phase to coalesce to form a continuous film on surface to be coated,
(l) High tensile strength when second phase solidifies on surface to be coated,
(m) Sufficient elasticity when in the solid form that the second phase elongates as organic solvent evaporates therefrom to remain adhered to the surface to be coated and bonded at the interfaces, and
(n) Is colorless and transparent so that the colors contained in the globules of the first phase and interspersed therethrough when the composition is applied to the surface to be coated will not appear altered when viewed through the second phase.

The following examples are given as further variations of the present multicolor composition:

*Example No. 2*

Same as Example No. 1 but with calcium carbonate eliminated therefrom and xylene increased to 94 parts by weight.

*Example No. 3*

Same as Example No. 1 but with diatomaceous earth substituted for calcium carbonate.

*Example No. 4*

Same as Example No. 1 but with chlorinated rubber substituted for the vinyl toluene-butadiene copolymer.

*Example No. 5*

Same as Example No. 1 but with polyurethane oil substituted for the vinyl toluene-butadiene copolymer.

*Example No. 6*

Same as Example No. 1 but with polyacrylic latex substituted for the polyvinyl acetate emulsion.

*Example No. 7*

Same as Example No. 1 but with butadiene-styrene latex substituted for the polyvinyl acetate emulsion.

*Example No. 8*

Same as Example No. 1 but with methyl cellulose substituted for the polyvinyl acetate emulsion.

The examples set forth above are illustrative of a multicolor coating composition, the novel features of which are as follows:

(1) An aqueous inner phase containing a first film former.

(2) An aqueous inner phase that is divided into two or two or more portions, each of which portions is pigmented to different colors.

(3) Subsequent dispersion of the different colored portions of the first phase as separate minute bodies or globules of a desired size that do not tend to coalesce.

(4) An organic outer phase in which said minute bodies or globules are suspended.

(5) An organic outer phase that contains a second film former.

(6) A transparent and colorless outer phase which forms a continuous film on the surface to be coated, and in which film said minute bodies or globules are suspended in spaced relationship.

(7) A suspension of minute bodies or globules of a first aqueous inner phase containing a first film former that are pigmented to two or more colors and an organic colorless transparent outer phase that are stable in the presence of a propellant which may be either a liquid having a high vapor pressure at room temperature or a gas.

(8) Is not limited to the use of a paint, lacquer, enamel or film-forming oil as a component thereof.

(9) May be applied equally well by discharge from a self-pressurized container, conventional paint spray gun, brush, dipping, or the like.

(10) Has greater covering ability per unit volume than previously available multicolor compositions in that both the first and second phases thereof contain first and second film formers.

(11) Has greater adhesion to the surface to be coated than previously available multicolor compositions for the second film former has an adhesive characteristic of greater magnitude than that possessed by paints, lacquers, enamels or oils capable of being dispersed as minute bodies or globules in an aqueous outer phase.

(12) Provides a continuous coating on the surface to be covered.

(13) The subdivided first phase does not tend to coalesce when suspended in a second phase that may serve as a propellant due to the high vapor pressure thereof.

(14) The subdivided first phase does not tend to coalesce when suspended in a second phase in which a propellant fluid is dissolved.

(15) The subdivided first phase does not tend to coalesce when suspended in a second phase that is exposed to a third phase which is a liquid having a substantial vapor pressure at room temperature and is miscible with said second phase.

After application to a desired surface, the first and second phases provide first and second vehicles respectively, that cooperatively define a continuous multicolor coating.

We claim:

1. A stable multicolor coating composition that can be applied as a spray or by brush to a surface to define a plurality of spaced areas of desired sizes of at least two different colors that are connected laterally and at least partially enveloped by a continuous colorless transparent layer of a second vehicle to permit viewing of said areas in their true colors, which composition prior to application thereof to said surface consists essentially of:

(a) a first aqueous vehicle consisting essentially of methyl cellulose and an emulsion of a polymerized first resin that serves as a first film former to define said spaced areas, with said first vehicle being divided into at least two portions, each of which portions contain a color pigment different from that in the other of said portions, and each of which portions are further subdivided without change in the compositions of said first and second vehicles into a plurality of separate non-cohesive minute globules of such volume as to define said areas when disposed on said surface, said minute globules being dispersed in (b) a second colorless transparent liquid vehicle comprising an aromatic hydrocarbon containing a non-fibrous suspension stabilizer selected from the group consisting of alkyl ammonium bentonite, finely divided calcium carbonate and diatomaceous earth and in which hydrocarbon a second colorless organic film former of a second polymerized resin is dissolved, with said first and second resins being so selected that there is a sufficient interface attraction between said globules and said second vehicle after deposition to assure that said surface is covered with a continuous layer defined by said first and second vehicles.

2. A multicolor coating composition as defined in claim 1 wherein said first film former is selected from the group consisting of polyvinyl acetate emulsion and butadiene-styrene latex.

3. A multicolor coating composition as defined in claim 1 wherein said second film former is selected from the group consisting of toluene-butadiene copolymer, chlorinated rubber, and polyurethane oil.

4. A multicolor coating composition as defined in claim 1 wherein said suspension stabilizer is an alkyl ammonium bentonite.

5. A multicolor coating composition as defined in claim 1 wherein said stabilizer is dimethyldioctadecyl ammonium bentonite that not only serves as a stabilizer, but increases the viscosity of said second vehicle, as well as imparting water repellent qualities to said multicolor coating composition.

6. A multicolor coating composition as defined in claim 1 wherein said stabilizer includes both an alkyl ammonium bentonite and finely divided calcium carbonate.

7. A multicolor coating composition as defined in claim 6 wherein said first film former is a polyvinyl emulsion.

8. A multicolor coating composition as defined in claim 1 which further includes:

(c) a pressurized fluid which is insoluble in said first vehicle for propelling said coating composition from a normally closed container as a spray.

References Cited

UNITED STATES PATENTS

| | | | |
|---|---|---|---|
| 2,591,904 | 4/1952 | Fola | 106—170 |
| 2,795,562 | 6/1957 | Jud | 260—9 |
| 2,964,417 | 12/1960 | Ward | 106—170 |
| 3,185,653 | 5/1965 | Knudsen | 260—4 |

OTHER REFERENCES

Talley: Low Odor Multicolor Paints, Paint Industry, vol. 24, No. 5, May 1959, pp. 11–14.

MURRAY TILLMAN, *Primary Examiner.*

J. T. GOOLKASIAN, *Assistant Examiner.*